United States Patent
Maloney et al.

(10) Patent No.: US 6,637,413 B2
(45) Date of Patent: Oct. 28, 2003

(54) ENGINE STARTING AND WARM-UP FUEL CONTROL METHOD HAVING LOW VOLATILITY FUEL DETECTION AND COMPENSATION

(75) Inventors: Peter James Maloney, Dearborn, MI (US); In Kwang Yoo, Ann Arbor, MI (US); Andrew D. Herman, Linden, MI (US); Hallett D. Breidenbach, West Bloomfield, MI (US); Deog H. Yoo, Inchon (KR); Craig A. Carlson, Honeoye Falls, NY (US)

(73) Assignee: Delphi Technologies, Inc., Troy, MI (US)

( * ) Notice: Subject to any disclaimer, the term of this patent is extended or adjusted under 35 U.S.C. 154(b) by 31 days.

(21) Appl. No.: 09/951,883

(22) Filed: Sep. 13, 2001

(65) Prior Publication Data

US 2002/0095977 A1 Jul. 25, 2002

Related U.S. Application Data

(60) Provisional application No. 60/232,265, filed on Sep. 14, 2000.

(51) Int. Cl.$^7$ ................................................ F02M 51/00
(52) U.S. Cl. ................... 123/491; 123/406.23; 123/480; 701/103; 701/104; 701/113
(58) Field of Search ........................... 123/339.1, 339.2, 123/339.23, 406.23, 406.53, 362, 491, 527, 674, 480, 436, 688; 701/103, 104, 108, 109, 113, 115

(56) References Cited

U.S. PATENT DOCUMENTS

| | | | | |
|---|---|---|---|---|
| 4,724,810 A | * | 2/1988 | Poirier et al. | 123/339.16 |
| 4,809,660 A | * | 3/1989 | Marsh et al. | 477/52 |
| 4,933,863 A | * | 6/1990 | Okano et al. | 123/110 |
| 5,163,399 A | * | 11/1992 | Bolander et al. | 123/339.17 |
| 5,186,155 A | * | 2/1993 | Miyashita et al. | 123/685 |
| 6,079,396 A | * | 6/2000 | Ament et al. | 123/674 |

* cited by examiner

*Primary Examiner*—Hieu T. Vo
*Assistant Examiner*—Johnny H. Hoang
(74) *Attorney, Agent, or Firm*—Jimmy L. Funke

(57) ABSTRACT

An improved engine fuel control detects combustion instability due to the use of high DI fuel during cold start and warm-up and compensates the fuel control for detected combustion instability through temporary enrichment of the delivered air/fuel ratio. The usage of high DI fuel is detected during an engine idle period following starting by monitoring the engine speed to identify an engine speed excursion more than a calibrated percentage below the desired idle speed. The detection method is enabled under specified environmental conditions, provided the engine run time is greater than a specified time and the engine temperature is within a specified range. Additionally, the method is disabled for a prescribed period following commanded load transitions associated with the air conditioning system and the automatic transmission. When the presence of high DI fuel is detected, and the air/fuel ratio is temporarily enriched to alleviate the instability and to ensure acceptable driveability without unnecessarily increasing hydrocarbon emissions in the engine exhaust gases.

5 Claims, 4 Drawing Sheets

ENGINE STARTING AND WARM-UP FUEL CONTROL METHOD HAVING LOW VOLATILITY FUEL DETECTION AND COMPENSATION

This application claims the benefit of provisional application Ser. No. 60/232,265 filed Sep. 14, 2000.

TECHNICAL FIELD

The present invention relates to a fuel control for an internal combustion engine designed to operate with a lean air/fuel ratio, and more particularly to a control that detects combustion instability due to the use of low volatility fuel during cold starting and warm-up, and for compensating the fuel control to alleviate detected instability.

BACKGROUND OF THE INVENTION

It is well known that motor vehicle fuels contain a variety of different compounds, and that the fuel volatility can therefore vary significantly from tank to tank. In an effort to quantify this variation, the industry has developed a driveability index (DI) based on a summation of specified distillation measurements, weighted to reflect their relative effect on combustion stability an internal combustion engine. In general, high volatility fuels have a relatively low DI value, whereas low volatility fuels have a relatively high DI value.

In an engine fuel control, the volatility of the injected fuel is most critical during cold starting and warm-up, since the internal surfaces of the engine may not be hot enough to vaporize a sufficient quantity of high DI fuel. For this reason, automotive fuel controls have traditionally been designed to enrich the cold calibration to ensure that the engine will start and run acceptably with high DI fuel. This enrichment to compensate for high DI fuel causes the air/fuel to be richer than optimum with medium and low DI fuel, resulting in higher hydrocarbon emissions than if the appropriate calibration were used. Thus, low emission engines designed to operate at leaner air/fuel ratios during cold starting and warm-up may experience degraded driveability due to combustion instability if a high DI fuel is being used. Accordingly, what is needed is a control method that permits the use of lean air/fuel ratio control during cold starting and warm-up while minimizing degraded driveability due to the use of high DI fuel.

SUMMARY OF THE INVENTION

The present invention is directed to an improved engine fuel control that detects combustion instability due to the use of high DI fuel during cold starting and warm-up and that compensates the fuel control for detected combustion instability through temporary enrichment of the delivered air/fuel ratio. According to the present invention, usage of high DI fuel is detected during an engine idle period following starting by monitoring the engine speed to identify an engine speed excursion more than a calibrated amount below the desired idle speed. The detection method is enabled under specified environmental conditions, provided the engine run time is greater than a specified time and the engine temperature is within a specified range. Additionally, the method is disabled for a prescribed period following commanded load transitions associated with the air conditioning system and the automatic transmission. When the presence of high DI fuel is detected, the air/fuel ratio of the engine is temporarily enriched to alleviate the instability and to ensure acceptable driveability without unnecessarily increasing hydrocarbon emissions in the engine exhaust gases.

BRIEF DESCRIPTION OF THE DRAWINGS

FIG. 4 depicts a routine for detecting combustion instability due to the use of high DI fuel during engine idling, and FIG. 5 depicts a routine for controlling the engine air/fuel ratio in response to the detection of high DI fuel.

DESCRIPTION OF THE PREFERRED EMBODIMENT

Figure 1:
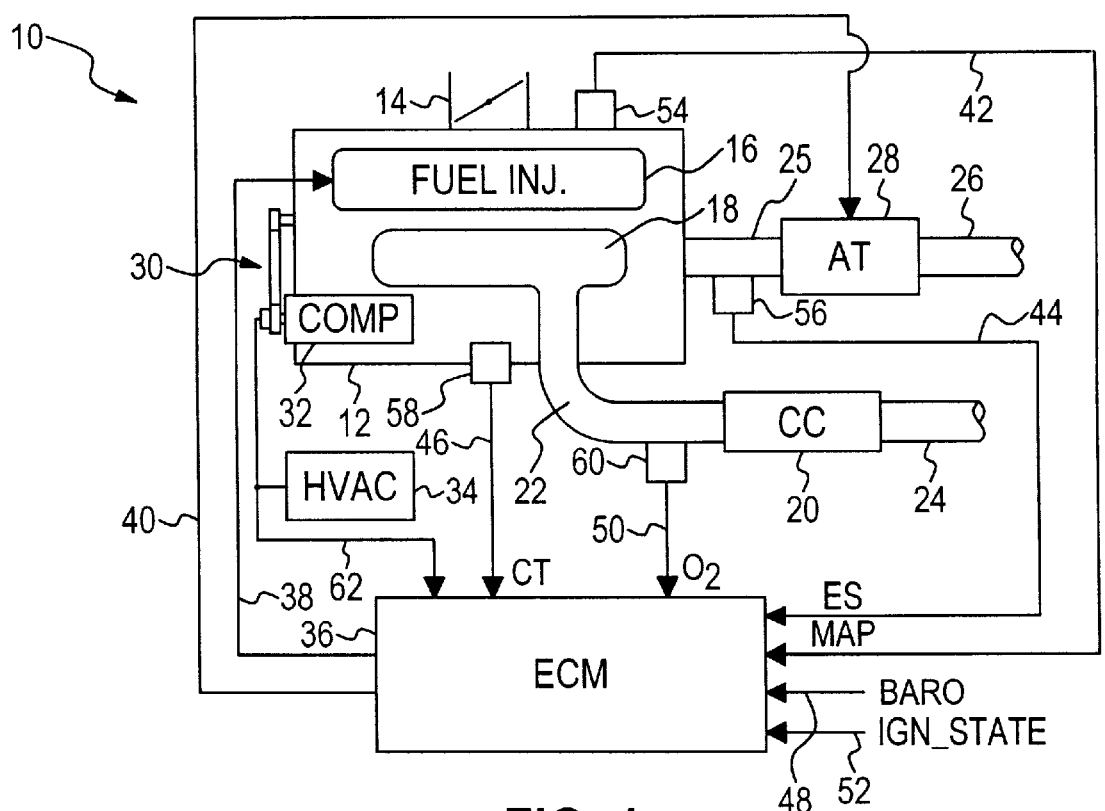
FIG. 1 is a diagram of an engine fuel control system, including a microprocessor-based engine control unit for controlling engine fueling.

Referring to the drawings, and particularly to FIG. 1, the reference numeral 10 generally designates a motor vehicle engine and control system according to this invention. The engine 12 includes a throttle valve 14 through which intake air is ingested, a fuel injection system 16 for injecting a precisely controlled quantity of fuel for mixture with the intake air, an exhaust manifold 18 for collecting exhaust gasses after the air/fuel mixture is ignited, a catalytic converter (CC) 20 coupled to the exhaust manifold 18 via runner 22, and a tail pipe 24 exiting the catalytic converter 20. The engine output shaft 25 is coupled to drive shaft 26 through an automatic transmission (AT) 28 as shown. Also, the engine 12 includes a pulley drive mechanism 30 for selectively driving the refrigerant compressor (COMP) 32 which is cycled on and off by a heating, ventilation and air conditioning (HVAC) control head 34 for controlled cooling and/or dehumidification of the vehicle cabin air.

The fuel injection system 16, automatic transmission 28 and other electronic sub-systems of the system 10 are controlled by a microprocessor-based engine control module (ECM) 36 in response to various inputs. To this end, ECM 36 is coupled to fuel injection system 16 via line 38, and to automatic transmission 28 via line 40. The control of transmission 28 primarily involves initiating shifting from one speed ratio to another in response to a number of inputs including engine speed and load, and the position of a driver manipulated range selector (not shown). The control of fuel injection system 16 involves determining an appropriate quantity of fuel to be injected into intake runners of engine 12 based on a measure or estimation of the ingested inlet mass air flow and a target air/fuel ratio for combustion in the engine cylinders. The input signals pertinent to these controls include the intake manifold absolute pressure (MAP) on line 42, the engine speed (ES) on line 44, the engine coolant temperature (CT) on line 46, the barometric pressure (BARO) on line 48, the exhaust gas oxygen signal (O2) on line 50, and the ignition state (IGN_STATE) on line 52. Such input signals are obtained with conventional sensors 54, 56, 58, 60 well known to those skilled in the art. Additionally, the compressor cycling control signal produced by HVAC control head 34 is supplied as an input to ECM 36 via line 62.

In general, ECM 36 determines an appropriate quantity of fuel to be injected by fuel injection system 16 based on a measure or estimation of the ingested inlet mass air flow and a target air/fuel ratio for combustion in the engine cylinders.

Figure 3:
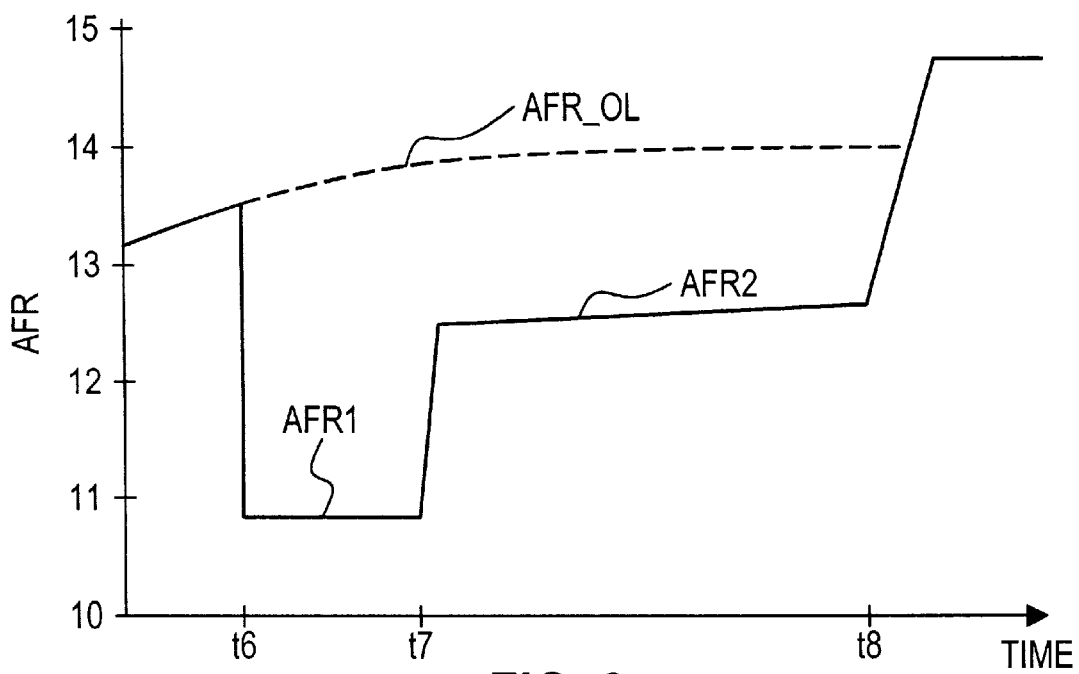
FIG. 3 is a graph depicting a control of engine air fuel ratio according to this invention.

During cold starting and warm-up of the engine 12, the exhaust gas oxygen sensor 60 is inoperative, and the fuel injection quantity is determined in an open-loop manner based on the above mentioned inputs to produce an open-loop air/fuel ratio AFR_OL, such as depicted by the corresponding trace in FIG. 3. Such ratio may be somewhat richer than the stoichiometric ratio as indicated since the internal surfaces of engine 12 are initially too cool to completely vaporize the injected fuel. This is particularly the case if the driveability index (DI) of the fuel is relatively high, indicating that a relatively high temperature is required to vaporize specified percentages of the fuel. While hydrocarbon emissions can be minimized by starting engine 12 with an air/fuel ratio that is as lean as possible, combustion instability can occur if an insufficient percentage of the injected fuel vaporizes, and of course, the fuel volatility can vary considerably. The present invention permits the use of a relatively lean open-loop air/fuel ratio control during cold starting and warm-up without risking combustion instability due to the presence of high DI fuel by identifying engine speed variation that is characteristic of high DI fuel usage during an engine idle period following starting, and adjusting the open-loop fuel control to temporarily enrich the delivered air/fuel ratio when high DI fuel is detected.

Figure 2:
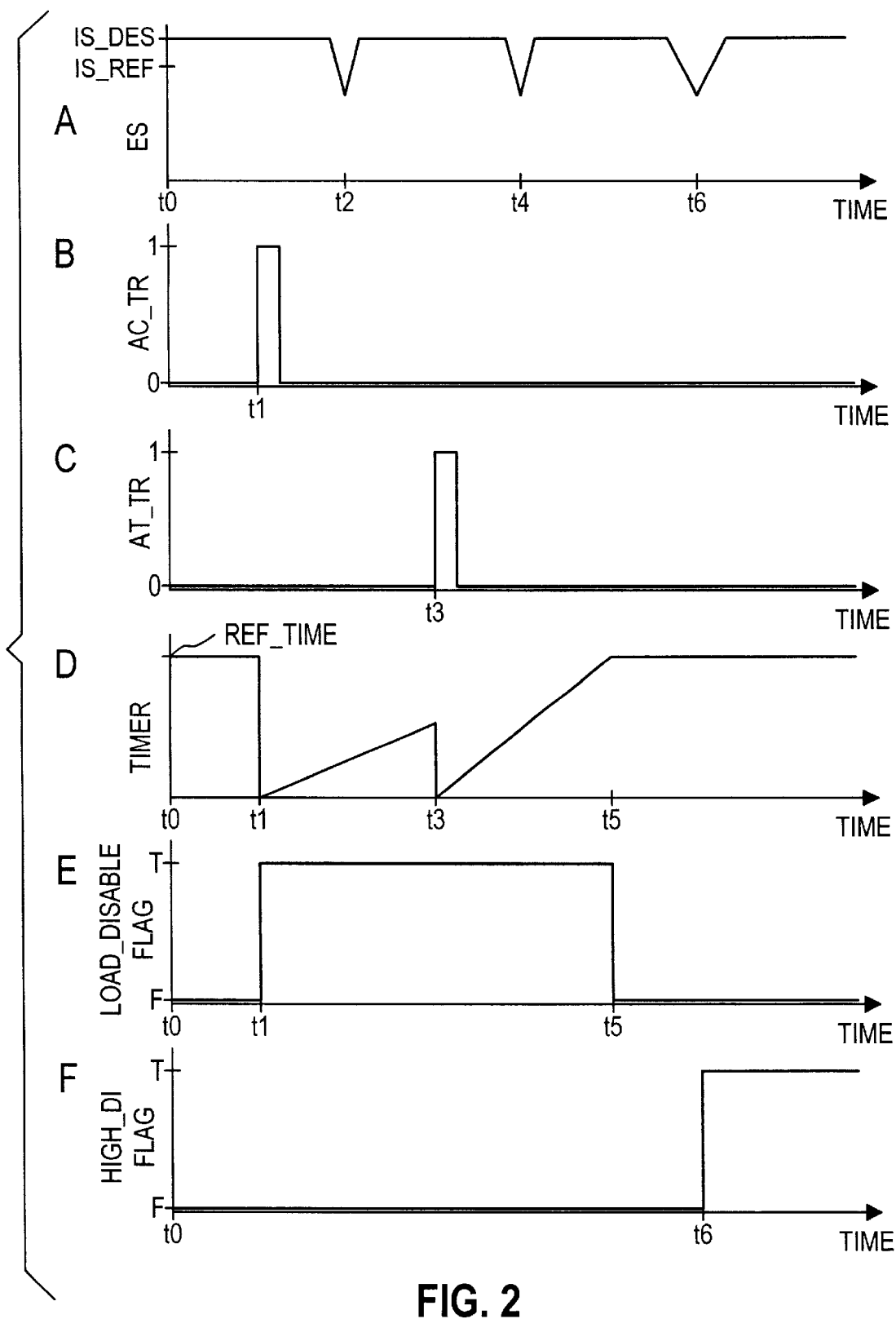
FIG. 2, Graphs A–F, graphically depict the operation of this invention when the engine of FIG. 1 is operated with high DI fuel.

The detection of high DI fuel according to this invention is graphically illustrated in FIG. 2. Graph A depicts the engine speed ES during an engine idle period, Graph B depicts a commanded transition AC_TR of the refrigerant compressor 32, Graph C depicts a commanded transition AT_TR of the automatic transmission 28, Graph D depicts a measured time (TIMER) according to the invention, and Graph E depicts the status of a LOAD_DISABLE flag according to this invention, and Graph F depicts the status of a HIGH_DI flag according to this invention, all as a function of time. In general, the presence of high DI fuel is detected if the engine speed ES during specified idle conditions falls to a predetermined percentage of the desired idle speed IS_DES, shown in Graph A. The detection method is enabled under specified environmental conditions, provided the engine run time (RUN_TIME) is greater than a specified time and the engine coolant temperature CT is within a specified range. Additionally, the method is disabled for a prescribed period following commanded load transitions of compressor 32 and automatic transmission 28.

In the example of FIG. 2, the time t0 signifies an initial state for which the timer is equal to a reference time REF_TIME, and the LOAD_DISABLE flag is FALSE, as seen in Graphs D and E. At time t1, the HVAC control head 34 signals an off-to-on transition of the refrigerant compressor 32, which results in the timer being reset to zero, as seen in Graphs B and D. Additionally, the LOAD_DISABLE flag is set to TRUE whenever the timer is less than TIME_REF, as seen in Graph E. The load transition due to compressor 32 being cycled on produces a negative excursion of the engine speed ES at time t2 as seen in Graph A, but the excursion is ignored for purposes of detecting the usage of high DI fuel since the LOAD_DISABLE flag is TRUE. At time t3 before the timer reaches REF_TIME, the ECM 36 signals an upshift transition of transmission 28, as seen in Graph C. As a result, the timer is reset to zero, and the LOAD_DISABLE flag remains TRUE, as seen in Graphs D and E. Thus, the negative excursion of engine speed ES at time t4 due to the transmission upshift is ignored for purposes of detecting the usage of high DI fuel. At time t5, the timer reaches REF_TIME, and the LOAD_DISABLE flag is set to FALSE, as seen in Graphs D and E. Thereafter at time t6, the engine speed ES falls below IS_REF due to the presence of high DI fuel in engine 12, and if the other enabling conditions of high DI fuel detection are met, the HIGH_DI flag is set to TRUE to indicate the presence of high DI fuel, as seen in Graph F.

Figure 4:
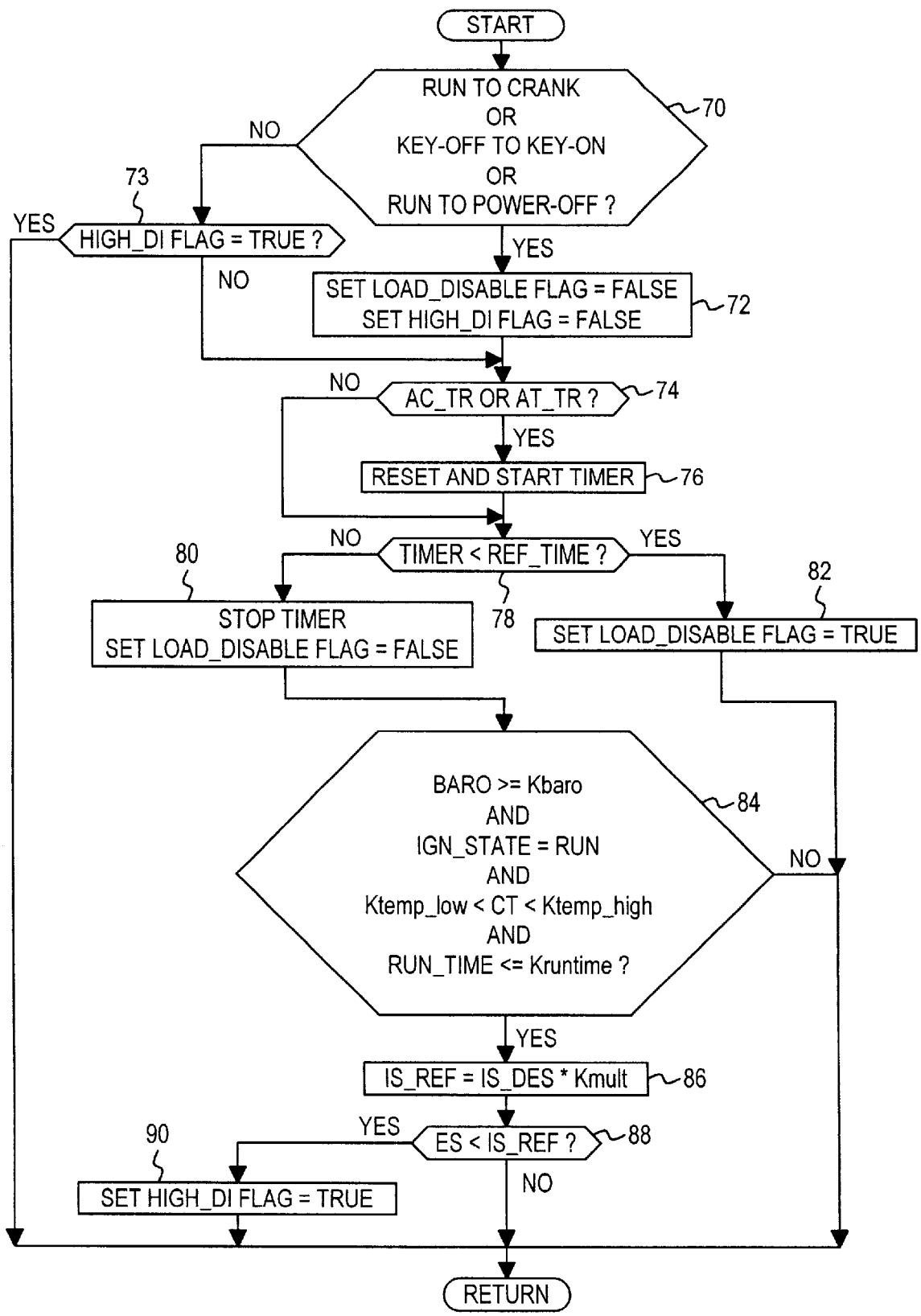
FIGS. 4–5 are flow diagrams representative of software routines executed by the engine control unit of FIG. 1 in carrying out the control of this invention.

FIG. 4 depicts a flow diagram of a routine periodically executed by ECM 36 for carrying out the above-described detection method. Referring to FIG. 4, the blocks 70 and 72 initialize the LOAD_DISABLE and HIGH_DI flags when IGN_STATE indicates a transition from run to crank, key-off to key-on, or run to power-off. If block 70 is answered in the negative, but block 73 determines that the HIGH_DI flag is TRUE, the routine is exited. Otherwise, the block 74 is then executed to determine if a transition of the compressor 32 or automatic transmission 28 has occurred since the routine was last executed; if so, block 76 resets and restarts the timer. The block 78 then compares the timer value to REF_TIME. If the timer value is less than REF_TIME, the block 82 sets the LOAD_DISABLE flag to TRUE, and the routine is exited. If the timer value is greater than or equal to REF_TIME, the block 80 stops the timer and sets the LOAD_DISABLE flag to FALSE, and the block 84 checks a number of conditions to determine if high DI fuel detection is enabled. As indicated, high DI fuel detection is enabled if each of the following conditions is met: (1) the barometric pressure BARO exceeds a calibrated value Kbaro; (2) IGN_STATE is Run; (3) the engine coolant temperature CT is in a range defined by the calibrated values Ktemp_low, Ktemp high; and (4) the engine run time does not exceed a calibrated time Kruntime. If any of the conditions are not met, block 84 is answered in the negative and the routine is exited. If block 84 is answered in the affirmative, the block 86 computes IS_REF as the product of the desired idle speed IS_DES and a calibrated multiplier Kmult, and the block 88 compares ES to IS_REF. If ES is less than IS_REF, the usage of high DI fuel is detected, and block 90 sets the HIGH-DI flag to TRUE, whereafter block 73 will be answered in the affirmative to prevent the HIGH_DI flag from being set to FALSE until the engine 12 stalls or is turned off.

Once the usage of high DI fuel is detected, the ECM 36 temporarily enriches the target air/fuel ratio, as graphically depicted in FIG. 3. When the HIGH_DI flag is set to TRUE at time t6 (using the example of FIG. 2), the desired air/fuel ratio is quickly reduced (enriched) to a fixed level AFR1 based on the product of the open-loop air/fuel ratio target AFR_OL at time t6 and a first fuel enrichment factor FEF1 determined as a function of the engine coolant temperature CT, and held at AFR1 for a predetermined time HOLD_TIME (signified by the duration t6–t7). Thereafter, the desired air/fuel ratio is increased (enleaned) to a variable level AFR2 based on the product of the current open-loop air/fuel ratio target AFR_OL and a second fuel enrichment factor FEF2, also determined as a function of CT. When closed-loop fuel control is enabled at time t8, the engine 12 is considered to be warmed-up, and the desired air/fuel ratio is ramped up (enleaned) to the stoichiometric ratio (or other closed-loop target ratio), whereafter closed-loop fuel control is initiated.

Figure 5:
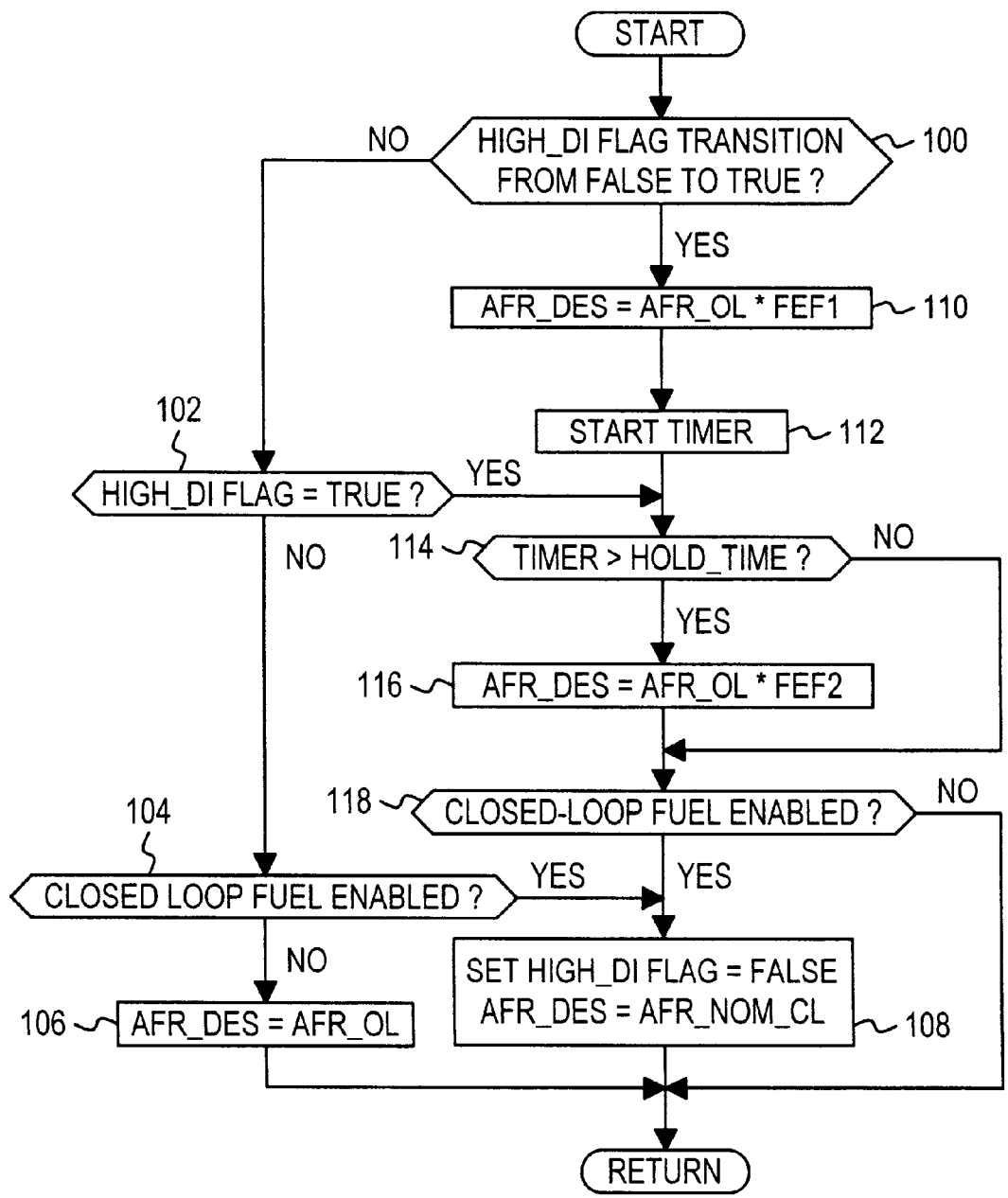

FIG. 5 depicts a flow diagram of a routine periodically executed by ECM 36 for carrying out the above-described air/fuel ratio control. Referring to FIG. 5, the block 100 is first executed to detect a transition of the HIGH_DI flag from FALSE to TRUE. Initially, of course, block 100 is answered in the negative, as are blocks 102 and 104, and block 106 sets the desired air/fuel ratio (AFR_DES) to AFR_OL. If the HIGH_DI flag is not set, AFR_OL is maintained until block 104 determines that closed-loop control is enabled, whereafter block 108 sets the HIGH_DI flag to FALSE and sets AFR_DES to the nominal closed-loop target ratio AFR_NOM_CL. When block 100 detects a transition of the HIGH_DI flag, block 110 sets AFR_DES to the product (AFR_OL * FEF1), and block 112 starts a timer. If the timer reaches HOLD_TIME before closed-loop fuel control is enabled, as determined by blocks 114 and 118, the block 116 is executed to set AFR_DES to the product (AFR_OL * FEF2). And when closed-loop fuel control is finally enabled, the block 108 is executed as described above to set the HIGH_DI flag to FALSE and set AFR_DES to the nominal closed-loop target ratio AFR_NOM_CL.

In summary, the control method of the present invention detects combustion instability due to the use of high DI fuel during cold starting and warm-up and compensates the fuel control for detected combustion instability. When the presence of high DI fuel is detected, the air/fuel ratio is temporarily enriched to alleviate the instability and to ensure acceptable driveability without unnecessarily increasing hydrocarbon emissions in the engine exhaust gases. While the present invention has been described in reference to the illustrated embodiments, it is expected that various modifications in addition to those mentioned above will occur to those skilled in the art. Thus, it will be understood that methods incorporating these and other modifications may fall within the scope of this invention, which is defined by the appended claims.

What is claimed is:

1. A method of operation for an internal combustion engine connected to drive one or more loads, said engine having an open-loop fuel control for maintaining an air/fuel ratio of said engine at a target value during engine starting and warm-up, comprising the steps of:

measuring a speed of said engine during engine idling following starting;

detecting transitions of said loads that influence said speed;

detecting a high driveability index fuel if said measured speed falls to a calibrated percentage of a desired engine idle speed;

disabling said step of detecting a high driveability index fuel if said transitions are detected; and temporarily enriching said air/fuel ratio relative to said target value when said high driveability index fuel is detected.

2. The method of operation of claim 1, wherein said loads include a refrigerant compressor and an automatic transmission, and said step of detecting transitions of said loads includes the step of:

detecting commanded cycling of said compressor or commanded shifting of said transmission.

3. The method of operation of claim 1, including the step of:

disabling said step of detecting said high driveability index fuel for a prescribed time interval following detection of said transitions.

4. The method of operation of claim 1, including step of:

disabling said step of detecting said high driveablity index fuel unless a temperature of said engine is within a prescribed range and a run time of said engine is less than a calibrated run time.

5. The method of operation of claim 1, wherein said step of temporarily enriching said air/fuel ratio includes the steps of:

holding said air/fuel ratio at a first value determined as a function of said target value and a temperature of said engine;

controlling said air/fuel ratio according to a second value intermediate said first value and said target value; and adjusting said air/fuel ratio to a closed-loop target value upon completion of said warm-up.

* * * * *